United States Patent [19]

Decroix et al.

[11] 3,998,994
[45] Dec. 21, 1976

[54] MODIFIED COPOLYMERS

[75] Inventors: Jean-Claude Decroix, St. Nicolas les Arras; Adrien Nicco, Bethune, both of France

[73] Assignee: Ethylene Plastique, Courbevoie, France

[22] Filed: May 12, 1975

[21] Appl. No.: 576,544

Related U.S. Application Data

[63] Continuation of Ser. No. 396,405, Sept. 12, 1973, abandoned, which is a continuation of Ser. No. 237,948, March 24, 1972, abandoned.

[30] Foreign Application Priority Data

Mar. 25, 1971 United Kingdom ............... 7854/71

[52] U.S. Cl. ................................. 526/15; 264/234; 264/237; 264/345; 264/348
[51] Int. Cl.$^2$ ...................... C08F 8/14; C08F 8/32
[58] Field of Search ................. 260/78.5 T; 526/15; 264/234, 237, 348

[56] References Cited

UNITED STATES PATENTS

| | | | |
|---|---|---|---|
| 2,977,334 | 3/1961 | Zopf et al. | 260/27 |
| 3,264,272 | 8/1966 | Rees | 260/78.5 |
| 3,678,016 | 7/1972 | Zimmerman et al. | 260/78.4 D |

FOREIGN PATENTS OR APPLICATIONS 7,007,125  11/1970  Netherlands

*Primary Examiner*—John Kight, III
*Attorney, Agent, or Firm*—Bacon & Thomas

[57] ABSTRACT

Modified copolymers which have viscosities which vary very markedly with changes in temperature are obtained by malaxating a statistical copolymer of ethylene and maleic anhydride containing between 0.5 and 20% by weight of units derived from maleic anhydride and having a melt index of between 0.1 and 500 dg/min, in the molten state with at least one chemical reagent containing at least two reactive groups which are amine or alcoholic —OH groups but at most primary or secondary amine group and at least one alcoholic —OH group.

13 Claims, No Drawings

MODIFIED COPOLYMERS

This is a continuation, of application ser. no. 396,405, filed Sept. 12, 1973, now abandoned which is a continuation of application Ser. No. 237,948 filed Mar. 24, 1972 now abandoned.

The present invention relates to modified copolymers of ethylene and maleic anhydride.

The statistical copolymers of ethylene and maleic anhydride are, in themselves, known; these products may be prepared by radical copolymerisation of a mixture of ethylene and maleic anhydride under high pressure. Generally, the copolymerisation conditions are chosen so that the units derived from the maleic anhydride account for between 0.5 and 20% by weight and so that the melt index of these copolymers is between 0.1 and 1,000.

It has already been proposed to react copolymers of ethylene and maleic anhydride with at least one primary or secondary polyamine thus forming a three-dimensional or crosslinked polymer, by reaction of the amine groups of the polyamine with the anhydride groups of the copolymer. This crosslinked polymer is stable, but rather difficult to molt, so that this process is of interest for treating shaped articles of the unmodified copolymer. The polyamines which may be used can optionally contain other organic groups, such as hydroxyl groups. Then, the changes in the properties of the starting copolymer arise not only from the crosslinking but also from the presence of reactive organic groups at the end of the reaction.

It has now been found, according to the present invention, that the statistical copolymers of ethylene and maleic anhydride containing between 0.5 and 20% of maleic anhydride-derived units, and which have a melt index of between about 0.1 and 500 dg/min, can be modified by chemical reagents which contain at least two reactive groups which are amino and alcohol (OH) groups, but which contain at most one primary or secondary amino group and at least one alcohol group.

The products of this invention may be prepared by malaxating the ethylene/maleic anhydride copolymer defined above with the defined modifying reagent at a temperature above the melting point of the copolymer and, preferably, under a nitrogen atmosphere. The duration of malaxation naturally depends on the temperature at which it is carried out, but it is generally of the order of 1 to 30 minutes if the temperature is of the order of 130° to 250° C.

It is also possible, according to the invention, to use, instead of ethylene/maleic anhydride copolymers, terpolymers which contain, as well as ethylene-derived units and between 0.5 and 20% of maleic anhydride-derived units, a small amount of a third monomer copolymerised, by a free radical process, with the other two. Such third monomers include, for example, olefines, vinyl derivatives and acrylic derivatives.

The presence of only one primary or secondary amino group in the modifying reagent prevents the formation of crosslinking bridges of the same type as those obtained if the reagent contains two amino groups. At least one bond originating from the reaction of a hydroxyl group with an anhydride group of the copolymer is, however, always formed i.e. an ester bond. Such a bond is labile at high temperatures where the following reaction is probably operative (with heat of reaction Q):

(anhydride ring) + (alcohol) ⇌ (ester-acid) +Q.

The final product of this invention thus possesses the important property that in the solid state it behaves like a crosslinked product but that it melts when heated and, in the molten state, has a viscosity which decreases rapidly with increasing temperature. Thus, in the molten state and at a relatively low temperature (for example 160° C.), the product is very viscous, whilst at a higher temperature (for example 250° C.) the product is very fluid; this variation in viscosity with temperature is much more rapid than in the case of polyethylenes, of ethylene-maleic anhydride copolymers and, more generally, of thermoplastic polyolefines in which no chemical change occurs with varying temperature. If a product of this invention is heated to 180°-300°, for example 220°-280° C, it appears that practically all the intermolecular bonds produced in the copolymer by the modifying reagent break. It is thought, although this invention is not limited by this theory, that the heating does not cause the breakage of the amide bonds but only of the ester bonds. It is clear that the various types of products obtained can show differences in properties which can be varied at will within a certain range. The process of this invention is, therefore, very versatile.

Suitable modifying reagents which may be used in the process of this invention include:

a. Polyalcohols: ethylene glycol, diethylene glycol, triethylene glycol (the glycols of higher molecular weight are also suitable), butanediol and trimethylolpropane.

b. Monoalcohols or polyalcohols which are primary or secondary monoamines: ethanolamine, diethanolamine, 1-amino2-propanol, 3-amino-1-propanol, 2-amino-1-butanol, 2-amino-2methyl-1,3-propanediol and phenylethanolamine.

c. Monoalcohols or polyalcohols which are tertiary monoamines or polyamines and, optionally, a primary or secondary monoamine: methyldiethanolamine, ethyldiethanolamine, phenyldiethanolamine, butyldiethanolamine, triethanolamine, dimethylethanolamine, diethylethanolamine, mono-oxyethylenated or di-oxyethylenated piperazine, polyoxyethylenated fatty amines such as "Noramox" obtainable from Messrs. PROCHINOR and polyoxyethylenated fatty diamines such as "Dinoramox" obtainable from Messrs. PROCHINOR.

d. Compounds as under a), b) or c), with one or more amido groups: polyoxyethylenated amides such as "ETHOMEED"of Messrs. MELLE BEZONS.

In addition to the actual reactive chemical groups (that is to say those which react with the chemical groups of the copolymer) for forming the intermolecular bridges, the chemical reagents used can, of course, contain other constituent chemical groups which do not in any way participate in the bridge-forming reaction, such as ether or ester groups, or are capable of catalysing this reaction between the polymer and the reactive groups of the additive, such as, for example, tertiary amino, and amido groups (see under d) above).

The amounts of reagent employed are expressed by the ratio of the total number of reactive groups (i.e. primary or secondary amine groups and alcohol groups) to the number of anhydride groups or diacid groups in the copolymer. The copolymerised maleic diacid groups play the same role as the anhydride groups as a result of the equilibrium reaction: (anhydride ring) + water ⇌ (diacid) +Q. A suitable amount of reagent is such that the ratio as defined above is between 0.05:1 and 1:1.

The conditions under which the reaction mixture is cooled markedly influence the properties of the resulting products of this invention, especially the mechanical properties and the melt index, and hence the number of intermolecular bridges created. Slow cooling favours the formation of the bridges and improves the mechanical properties.

Various additives or components can be incorporated into the ethylene-maleic anhydride base copolymer, before carrying out the bridge-forming reaction, so as to obtain certain special characteristics. Thus mineral fillers, colouring pigments and compatible polymers or elastomers, especially olefine polymers and elastomers, such as ethylenepropylene copolymers, polyisobutylene, butyl rubber and the like, can be added in amounts up to, for example, 100 parts per 100 parts of copolymer. Closed cell expanded (foamed) products having a fine and regular structure can be produced by incorporating suitable proportions of a blowing agent, which decomposes on heating, into the base copolymer.

Suitable blowing agents which can be used include azodicarbonamide (Genitron AC), dinitrosopentamethylenetertramine (Porofor DNO — or Vulcacel BN), salicylaldazine (Genitron SA) and aminoguanidine dicarbonate (Genitron AG).

As indicated above, the products of this invention display the very useful property of being crosslinked in the solid state and very fluid at high temperatures (220°–280° C.); this renders the products of great value in conventional methods of processing plastics. Furthermore the products have, inter alia, the following properties: Noteworthy mechanical properties and excellent stress-cracking resistance and creep resistance, in the solid state; useful surface properties which can furthermore be modified to a certain degree by varying the nature and number of so-called "non-reactive supplementary groups" present in the molecule of the modifying reagent used; thus, the adhesion of these products to various substrates such as metals, polymers, glass and the like can be very high; again, these products can be wettable, printable or rendered antistatic. They generally have greater oxidation resistance than that of common polyethylenes, all other conditions being the same.

Because of their valuable properties, the products according to the invention can be used in very many industrial applications, including injection, extrusion, and blow-moulding, rotational moulding, and in expansion and coatings.

In the following Examples which further illustrate the present invention, the various tests and measurements were conducted as follows:

The "melt index"; this was determined according to Standard Specification ASTM D 1238 62T, at 190° C., using a weight of 2.16 kg, and is expressed in dg/min.

The degree of solubility in boiling technical xylen, and

The degree of reaction of the anhydride-derived units initially present in the copolymer; this degree of reaction is defined by:

$$(X_0 - X)/X_0 \times 100 = T$$

$X_0$ being the percentage by weight of maleic anhydride-derived units present in the initial copolymer, and $X$ being the percentage by weight of maleic anhydride-derived units present in the final product. This degree of reaction was measured by infra-red spectroscopy.

In the Examples, six copolymers of ethylene and maleic anhydride were used, the characteristics of which are given in Table 1.

Table I

| Reference No. of the polymer | Maleic anhydride, % | Melt index | Young's modulus, kg/cm² | Yield point kg/cm² | Tensile strength kg/cm² | Elongation at break, % |
|---|---|---|---|---|---|---|
| 1 | 2.8 | 4.5 | 1766 | 87 | 124 | 400 |
| 2 | 2.6 | 2.2 | 1710 | — | 138 | 465 |
| 3 | 7 | 60 | 1352 | 72 | 79 | 78 |
| 4 | 0.8 | 2 | — | — | 156 | 539 |
| 5 | 5.8 | 72 | — | — | 113 | 390 |
| 6 | 3 | 49 | — | — | 75 | 113 |

A) Variations in the degree of reaction and the meltindex as a function of the amount of reagent introduced.

A. Variations in the degree of reaction and the melt index as a function of the amount of reagent introduced.

EXAMPLES 1 to 7

The copolymer 1 was treated in a malaxator of the Brabender type, at a temperature of 130° C., and under a nitrogen atmosphere, for 15 minutes after introduction of the modifier. The modifiers used were ethylene glycol and ethanolamine, and the reagents $S_2$ to $S_{11}$. These reagents are commercially available polyoxyethylenated alkylamines. The essential component of which is the product of the formula:

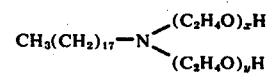

in which $x$ and $y$ are integers which are the same or have nearly the same value, and $x + y$ is equal to $n$, indicated by the symbol $S_n$.

The results obtained are shown in Table II.

TABLE II

| Example No. | Copolymer | Modifier | Content Y - % | Melt index | Degree of reaction,% |
|---|---|---|---|---|---|
| 1 | | Ethylene glycol | 100 | 0.08 | 10.5 |
| 2 | | | 25 | 0.02 | 21.2 |
| 3 | No. 1 | Ethanolamine | 100 | 0.005 | 51 |
| 4 | | S2 | 25 | 0.73 | 22.2 |
| 5 | | | 100 | 0.03 | 47.4 |

TABLE II-continued

| Example No. | Copolymer | Modifier | Content Y - % | Melt index | Degree of reaction,% |
|---|---|---|---|---|---|
| 6 | | S 11 | 50 | 0.03 | 48.8 |
| 7 | | S 11 | 100 | 0.02 | 61.5 |
| blank | | 0 | 0 | 4.5 | 0 |

Y represents the molar ratio of modifier, expressed as a percentage of reactive groups used ($[OH] + [NH] + [NH_2]$) relative to the anhydride or diacid groups initially present in the copolymer.

EXAMPLES 8 to 11

The treatment of the copolymer 1 was carried out as indicated in Examples 1 to 7, using triethylene glycol TEG and reagent S11.

However, before subjecting the said copolymer 1 to this treatment, it was heated to 250° C for 5 hours in vacuo, to remove the volatile constituents, especially the moisture held by the polymer.

The results obtained are reported in Table III.

TABLE III

| Example No. | Copolymer | Modifier | Content Y - % | Melt index | Degree of reaction, % |
|---|---|---|---|---|---|
| 8 | | Triethylene glycol | 10 | 2.4 | 3.22 |
| 9 | No. 1 | Triethylene glycol | 40 | 0.01 | 26.8 |
| 10 | | S 11 | 5 | 0.38 | 18.5 |
| 11 | | S 11 | 100 | 0.05 | 70.8 |

EXAMPLES 12 to 17

The copolymer 3 is heated in vacuo at 250° C, as described in Examples 8 to 11, and then treated with triethylene glycol, $S_{11}$ and $S_2$, as described in Examples 1 to 7.

The results obtained are contained in Table IV.

TABLE IV

| Example No. | Copolymer | Modifier | Content Y - % | Melt index | Degree of reaction, % |
|---|---|---|---|---|---|
| 12 | | T E G | 5 | 22.5 | 14 |
| 13 | | T E G | 20 | 0.05 | 19.4 |
| 14 | No. 3 | S 11 | 5 | 2.3 | 18 |
| 15 | | S 11 | 20 | 0.015 | 47 |
| 16 | | S 2 | 5 | 19 | 14 |
| 17 | | S 2 | 20 | 0.5 | 40.7 |

B) Examples of some properties of the products according to the invention.

B. Examples of some properties of the products according to the invention.

EXAMPLES 18 to 23

The copolymers 1, 2 and 3 were treated with various chemical reagents as indicated in Examples 1 to 7; the results obtained are shown in Table V.

TABLE V

| Example No. | Copolymer | Modifier | Content Y - % | Melt index | Young's modulus kg/cm² | Yield point kg/cm² | Tensile strength % | Elongation at break, % | Stress-cracking resistance, time |
|---|---|---|---|---|---|---|---|---|---|
| blank | | 0 | 0 | 4.5 | 1766 | 87 | 124 | 400 | 6 mins. |
| 18 | | Ethylene glycol | 50 | 0.039 | 1526 | 99 | 118 | 251 | >312 hrs. |
| 19 | No. 1 | S 11 | 12 | 0.19 | 1401 | 88 | 132 | 300 | >312 hrs. |
| 20 | | S 2 | 32 | 0.057 | 1213 | 94 | 134 | 247 | >312 hrs. |
| blank | No. 2 | 0 | 0 | 2.2 | 1710 | — | 138 | 465 | 6 mins. |
| 21 | | S 11 | 4.6 | 1.06 | 1632 | 96 | 131 | 359 | >312 hrs. |
| blank | | 0 | 0 | 60 | 1352 | 72 | 79 | 73 | 6 mins. |
| 22 | No. 3 | S 11 | 7 | 0.07 | 1228 | 72 | 120 | 278 | >312 hrs. |
| 23 | | T E G | 17 | 0.08 | 1273 | 74 | 118 | 270 | >312 hrs. |

The stress-cracking resistance measurements were carried out according to the Bell test in accordance with Standard Specification ASTM D. 1693, using Hostapal HL (manufactured by Messrs. Hoechst) as the stress-cracking agent. The content Y expresses the content of modifier as in Table II.

EXAMPLES 24 and 25

Copolymer 3 was heated to 250° C in vacuo for 5 hours and was then treated with triethylene glycol and $S_{11}$ as indicated in Examples 1 to 7. The adhesion of the products obtained was measured on a glass substrate and on an aluminium substrate. The results obtained are given in Table VI.

TABLE VI

| Example No. | Copolymer | Modifier | Content Y - % | Adhesion to aluminium, 10³, dynes/cm | Adhesion to glasses 10³, dynes/cm |
|---|---|---|---|---|---|
| blank | | 0 | 0 | 324 | 200 |
| 24 | No. 3 | T E G | 15 | 460 | >2000 when the material breaks |
| 25 | | S 11 | 10 | 568 | >2000 when the material breaks |

The adhesion measurements are carried out according to Standard Specification ASTM D 903.49, using a pulling speed of 100 mm/minute.

The specimens are prepared at a temperature of 200° C in accordance with the method described in this Standard Specification. The thickness of the polymer layer is 200 $\mu$.

process is carried out in the grader, the nozzle of which is stoppered. After 15 minutes at 250° C, the product is extruded and cooled in air. Its grade is again measured under standardised conditions. The results are summarised in Table VIII.

TABLE VII

| Example No. | Copolymer | Modifier | Content Y - % | Grade dg/min |  |  |  |  |
|---|---|---|---|---|---|---|---|---|
|  |  |  |  | 160° | 190° | 220° | 250° | 280° |
| blank |  | 0 | 0 | 2.5 | 5 | 11.5 | 23 | 45 |
| 26 | No. 1 | T E G | 10 | 0.27 | 2.4 | 9.7 | 23 | 48 |
| 27 |  | S 11 | 20 | <0.001 | 0.06 | 2.6 | 17 | 45 |
| blank |  | 0 | 0 | 29 | 60 | 125 | 240 | 440 |
| 28 |  | S 11 | 5 | 0.055 | 2.2 | 43 | 170 | 380 |
| 29 | No. 3 | T E G | 15 | 0.003 | 0.34 | 26 | 120 | 360 |
| 30 |  | S 2 | 15 | 0.08 | 0.75 | 23 | 180 | 460 |
| blank | P E | 0 | 0 | 0.85 | 2.1 | 4.8 | 10 | 16 |

The content Y expresses the content of modifier as in Table II. PE is high pressure polyethylene.

TABLE VIII

| Example No. | Copolymer | Modifier | Content Y - % | Grade at 190° C | Grade at 190° C after heating at 250° C |
|---|---|---|---|---|---|
| blank |  | 0 | 0 | 5 | 5 |
| 31 |  | S 2 | 6 | 1.04 | 0.98 |
|  | No. 1 |  |  |  |  |
| 32 |  | S 11 | 6 | 1.02 | 1.11 |
| 33 |  | T E G | 12 | 0.85 | 0.53 |

The content Y expresses the content of modifier, as in Table II.

C. Examples of the effect of the temperature on the melt viscosity of the products according to the invention.

EXAMPLES 26 – 33

The results obtained are shown in Tables VII and VIII. In Table VII the results which show the variation in the "grade" of certain products as a function of the temperature have been collected. The grade or melt index is determined in accordance with Standard Specification ASTM D 1236,62T, using a weight of 2.160 kg, but at various temperatures; it is expressed in dg/min.

The content Y expresses the content of modifier as in Table II.

EXAMPLES 34 – 41

The influence of the cooling conditions on the properties of the products according to the invention and on the formation of greater or lesser numbers of intermolecular bonds has been demonstrated. Slow cooling noticeably reduces the melt index and improves the properties connected therewith, especially the mechanical properties and the stress-cracking resistance and creep resistance.

Table IX gives some of the results obtained. The general conditions for carrying out these experiments are identical to those of the preceding experiments.

Table IX

| Example No. | Copolymer | Modifier | Y - % | Grade | Rapid cooling+ |  | Slow cooling |  |
|---|---|---|---|---|---|---|---|---|
|  |  |  |  |  | Breaking load, kg/cm² | Elongation, % | Breaking load, kg/cm² | Elongation % |
| blank | No. 5 | 0 | 0 | 72 | 113 | 390 | 110+ | 127+ |
| 34 | " | DEG | 20 | 0.31 | 135 | 432 | 174+ | 454+ |
| 35 | " | DEG | 75 | <0.01 | 118 | 198 | 172+ | 339+ |
| 36 | " | S₁₁ | 10 | 0.52 | 128 | 363 | 154+ | 402+ |
| 37 | " | S₁₁ | 30 | 0.02 | 126 | 233 | 145+ | 298+ |
| blank | 2 | 0 | 0 | 2.2 | 131.7 | 420 | 135* | 441* |
| 38 | " | DEG | 22.5 | 0.04 | 143 | 385 | 154* | 461* |
| 39 | " | DEG | 55 | <0.01 | 132.7 | 277 | 164* | 414* |
| 40 | " | MDEA | 15 | 0.14 | 155 | 372 | 167* | 426* |
| 41 | 4 | DEG | 20 | 0.1 | 139++ | 413++ | 155* | 521* |

DEG = diethylene glycol
+rapid cooling: from 180° C to 20° C in 5 minutes.
+slow cooling: 180° C to 80° C in 2 hours.
*slow cooling: 180° C to 130° C in 40 minutes.
++values obtained by very rapid cooling (quenching)

The results reported in Table VIII show that the phenomenon of variation in the grade of the products as a function of the temperature is reversible.

The modified polymer is heated to a high temperature, 250° C, for 15 minutes and then cooled. The The creep resistance of these products is also improved.

In Table X, the deformation (elongation in %) occurring under load and after release of the load is indicated as a function of the time, expressed in hours.

The experiments were carried out with a reference polyethylene (PE) and with the copolymer No. 5 treated as indicated in Examples 35 and 37, which has undergone slow cooling. The tension is 55 kg/cm² and the temperature is 65° C.

TABLE X

| Polymer | Grade | Elongation under load % | | | Residual elongation after release of load | |
|---|---|---|---|---|---|---|
| | | 15 mins | 20 mins | 2 hrs. 30 mins | 30 mins | 9 hrs 30 mins |
| PE | 0.3 | 147 | 190 | 327 | 234 | 198 |
| Example 35 | <0.01 | 135 | 160 | 231 | 106 | 83 |
| Example 37 | 0.02 | 126 | 153 | 251 | 114 | 88 |

EXAMPLES 42 – 48

A certain number of the preceding experiments were repeated, but incorporating another constituent, namely an inorganic filler, inorganic or organic colouring pigment, carbon black and/or an elastomer (such as) an ethylenepropylene copolymer, polyisobutylene, or butyl rubber into the base copolymer before the addition of the reagent.

The products according to the invention tolerate high proportions of fillers whilst retaining excellent mechanical properties of stress-cracking resistance and creep resistance. Certain characteristics such as the modulus of elasticity can also be modified within wide limits by incorporating such fillers.

The results of a certain number of experiments are given in Table XI.

TABLE XI

| Example No. | Compositions | Content Y-% | Young's modulus kg/cm² | Yield point, kg/cm² | Tensile strength, kg/cm² | elongation at break, % |
|---|---|---|---|---|---|---|
| 42 | Copolymer No. 6–90% EPR 404 +-10% | 0 | 1112 | 60 | 63 | 209 |
| 43 | ", with S 11 | 10 | 1112 | 63 | 86 | 371 |
| 44 | Copolymer No. 6–70% EPR 404–30% | 0 | 453 | 36 | 40 | 148 |
| 45 | ", with DEG | 20 | 633 | 42 | 51 | 215 |
| 46 | Copolymer No. 6–98% ZnO–2% | 0 | | | 75 | 102 |
| 47 | ",+ butyl-diethanolamine | 15 | — | — | 94 | 394 |
| 48 | ",+ S 2 | 15 | — | — | 79 | 185 |

+- EPR 404: copolymer of ethylene (43%) and propylene (57%), of "grade 0.038 at 190° C".

EXAMPLES 49 – 50

Expanded products with uniform, fine, closed cells were prepared by incorporating into the base copolymer a blowing agent of suitable decomposition temperature, followed by the bridge-forming reagent.

The mixture is malaxated and homogenised at a temperature below the decomposition threshold of the blowing agent and is molded in a press, heated under pressure to a sufficient temperature, and for a sufficient length of time, to cause the blowing agent to decompose, and then released from the pressure and gradually cooled.

Sheets or slabs of fine and uniform cell structure are obtained.

Suitable blowing agents which can be used are, for example:
Axodicarbonamide (Genitron AC)
Dinitrosopentamethylene-tetramine (Porofor DNO — or Vulcacel BN)
Salicylaldazine (Genitron SA)
Aminoguanidine dicarbonate (Genitron AG)

TABLE XII

| Example No. | Copolymers | Compositions | Content Y-% | Decomposition temperature | Density before expansion | Density after expansion | Expansion ratio |
|---|---|---|---|---|---|---|---|
| 49 | No. 6 | ZnO 2%, azo-dicarbonamide 6% D.E.G. | 20 | 180° | 0.96 | 0.24 | 4 |
| 50 | No. 6 | E.P.R. 404 30%, ZnO 2%, azodicarbonamide 6% + NS 11 | 10 | 180° | 0.94 | 0.46 | 2.04 |

EXAMPLES 51 to 56

Terpolymers of ethylene, maleic anhydride and ethyl maleate (content between 0.5 and 1.5% by weight) are treated as in Examples 1 to 7 with compounds resulting from the condensation of ethylene oxide or glycidol with polyamines. These compounds contain in their molecule at least 2 to 4 hydroxyl groups and at most 1 primary or secondary amine group.

The characteristics of the terpolymers used for these examples are reported in the following table:

| Polymer No. | MA - % | Melt index | Tensile strength kg/cm$^2$ | Elongation at break % |
|---|---|---|---|---|
| No. 7 | 2.37 | 58 | 64 | 154 |
| No. 8 | 4.77 | 50 | 74 | 284 |

| Example No. | Terpolymer | Modifier | % | Grade dg/min 160° | 190° | 220° | 250° |
|---|---|---|---|---|---|---|---|
| blank | | 0 | 0 | 21 | 58 | 89 | 147 |
| 51 | | HMD + 2 EO | 15 | 0.4 | 4 | 28 | 139 |
| 52 | No. 7 | HMD + 3 EO | 15 | 1.4 | 12 | 65 | 170 |
| 53 | | DETA + 4 EO | 10 | 5.5 | 19 | 81 | 147 |
| blank | | 0 | 0 | 22 ;11 | 50 | 85 | 160 |
| 54 | | HMD + 2 EO | 10 | 1.2 | 5 | 14 | 39 |
| 55 | No. 8 | HMD + 3 EO | 10 | 0.2 | 1.5 | 15 | 71 |
| 56 | | DETA + 4 EO | 10 | 0.2 | 1 | 14 | 85 |

HMD = hexamethylenediamine
DETA = diethylenetriamine
EO = ethylene oxide.

Similar results were found with reagents obtained by reacting HMD with glycidol.

EXAMPLES 57 to 60

The terpolymers 7 and 8 are treated as indicated in Examples 1 to 7, and the results obtained are given below:

| Example No. | Terpolymer | Modifier | Content Y - % | Melt index at 190° dg/min | Load at break kg/cm$^2$ | Elongation at break % |
|---|---|---|---|---|---|---|
| blank | | 0 | 0 | 58 | 64 | 154 |
| 57 | No. 7 | HMD + 2 EO | 15 | 4 | 90 | 302 |
| 58 | | DETA + 4 EO | 5 | 20 | 73 | 188 |
| blank | | 0 | 0 | 50 | 74 | 284 |
| 59 | NO. 8 | HMD + 3 EO | 10 | 1.5 | 104 | 208 |
| 60 | | DETA + 4 EO | 10 | 1 | 106 | 184 |

We claim:

1. A modified ethylene-maleic anhydride copolymer composition which comprises a malaxed statistical copolymer of ethylene and maleic anhydride having a melt index of between 0.1 and 500 dg/min. in the molten state and containing between 0.5 and 20% by weight of units derived from maleic anhydride and at least one chemical reagent containing at least two reactive groups which are amine or alcoholic —OH groups but at most one primary or secondary amine group and at least one alcoholic —OH group, wherein the chemical reagent is present in an amount such that the total number of primary amine, secondary amine and alcoholic —OH groups of said reagent to the number of anhydride groups of the copolymer is between 0.05 and 1.

2. The composition according to claim 1, in which the chemical reagent contains at least one other chemical group which is an ether, ester, amide or tertiary amine group.

3. The composition according to claim 1 in which the malaxation is carried out for 1 to 30 minutes at a temperature from 130° to 250° C.

4. The composition according to claim 1 in which the chemical reagent is a polyalcohol, a mono- or polyalcohol which is a primary or secondary monoamine, a mono- or poly-alcohol which is a tertiary monoamine or polyamine and, optionally, a primary or secondary monoamine, or an amide of such an alcohol.

5. The composition according to claim 4 in which the chemical reagent is ethylene glycol, triethylene glycol, ethanolamine or the reaction product of ethylene oxide with hexamethylenediamine or diethylenetriamine.

6. The composition according to claim 1 in which a mineral filler, colouring pigment, blowing agent or compatible polymer or elastomer is incorporated into the copolymer.

7. The composition according to claim 1 in which the copolymer is also derived from a small amount of a third monomer which is an olefine or a vinyl or acrylic derivative.

8. The composition according to claim 7 in which the copolymer is derived from 0.5 to 1.5% by weight of ethyl maleate.

9. The composition according to claim 1 wherein the modified copolymer composition has a stress-cracking resistance time of more than 312 hours according to the standard specification ASTM D. 1693.

10. The composition according to claim 1 wherein the modified copolymer composition has an adhesion on a glass substrate of more than 2000 x 10$^3$ dynes/cm according to standard specification ASTM D. 903.49.

11. The composition according to claim 1 which was slowly cooled between from 180° to 130° C in 40 minutes.

12. The composition as claimed in claim 1 which was slowly cooled between 180° and 80° C in 2 hours.

13. The composition according to claim 1 wherein the chemical reagent is a polyoxyethylenated alkylamine of the formula:

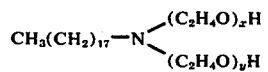

wherein $x + y$ is equal to 2 or 11.

* * * * *